US011619266B2

United States Patent
Adams et al.

(10) Patent No.: US 11,619,266 B2
(45) Date of Patent: Apr. 4, 2023

(54) SELF LUBRICATING TITANIUM ALUMINIDE COMPOSITE MATERIAL

(71) Applicant: Roller Bearing Company of America, Inc., Oxford, CT (US)

(72) Inventors: Frank C. Adams, Irvine, CA (US); Mark Heuberger, Derby, CT (US); Charles E. Smith, Fountain Valley, CA (US); Patrick S. Boyan, Rancho Santa Margarita, CA (US); Ernest K. Robinson, Rowland Heights, CA (US)

(73) Assignee: Roller Bearing Company of America, Inc., Oxford, CT (US)

( * ) Notice: Subject to any disclaimer, the term of this patent is extended or adjusted under 35 U.S.C. 154(b) by 627 days.

(21) Appl. No.: 16/282,727

(22) Filed: Feb. 22, 2019

(65) Prior Publication Data
US 2019/0264746 A1    Aug. 29, 2019

Related U.S. Application Data

(60) Provisional application No. 62/635,211, filed on Feb. 26, 2018.

(51) Int. Cl.
*F16C 33/66* (2006.01)
*C22C 14/00* (2006.01)
(Continued)

(52) U.S. Cl.
CPC .......... *F16C 33/6696* (2013.01); *C22C 14/00* (2013.01); *C22C 30/00* (2013.01);
(Continued)

(58) Field of Classification Search
CPC .. F16C 33/6696; F16C 33/1095; F16C 19/04; F16C 23/045; C22C 32/0036; C22C 32/0068; C22C 32/0078
See application file for complete search history.

(56) References Cited

U.S. PATENT DOCUMENTS 5,196,162 A * 3/1993 Maki ................ C22C 14/00
                                                    148/421
5,205,876 A * 4/1993 Sakai ................ C22C 14/00
                                                    148/421
(Continued)

FOREIGN PATENT DOCUMENTS

CN       103205622 A     7/2013
EP        1927670 A1     6/2008
(Continued)

OTHER PUBLICATIONS

Guo et al., "Development and validation of a rigid-flexible coupled dynamic valve-train model", (2012), Proc. IMechE vol. 226 Part D: J. Automobile Engineering, DOI: 10.1177/0954407011413973 (Year: 2012).*

(Continued)

*Primary Examiner* — Anthony J Zimmer
*Assistant Examiner* — Ricardo D Morales
(74) *Attorney, Agent, or Firm* — Robinson & Cole LLP

(57) ABSTRACT

A composite material having an alloy matrix including titanium, aluminum, niobium, manganese, boron, and carbon is disclosed. The composite material includes, by atomic percentage, 40.0% to 50.0% Al, 1.0% to 8.0% Nb, 0.5% to 2.0% Mn, 0.1% to 2.0% B, and 0.01% to 0.2% C. The composite material is doped with a solid lubricant such as $MoS_2$, ZnO, CuO, hexagonal boron nitride (hBN), $WS_2$, $AgTaO_3$, $CuTaO_3$, $CuTa_2O_6$, or combinations thereof. Components composed of the composite material exhibit increased ductility at room temperature and reduced fracture tendency, resulting in improved durability.

37 Claims, 4 Drawing Sheets

(51) Int. Cl.

| | |
|---|---|
| *C22C 30/00* | (2006.01) |
| *F16C 19/04* | (2006.01) |
| *F16C 23/04* | (2006.01) |
| *F16C 33/10* | (2006.01) |
| *C22C 32/00* | (2006.01) |
| *B22F 3/10* | (2006.01) |
| *C22C 1/05* | (2006.01) |

(52) U.S. Cl.
CPC ...... *C22C 32/0036* (2013.01); *C22C 32/0068* (2013.01); *C22C 32/0078* (2013.01); *F16C 19/04* (2013.01); *F16C 23/045* (2013.01); *F16C 33/1095* (2013.01); *B22F 3/1028* (2013.01); *C22C 1/05* (2013.01)

(56) References Cited

U.S. PATENT DOCUMENTS

| | | | |
|---|---|---|---|
| 5,350,466 A * | 9/1994 | Larsen, Jr. | ............ C22C 14/00 148/421 |
| 6,170,990 B1 | 1/2001 | Hawkins | |
| 6,214,133 B1 | 4/2001 | Deevi et al. | |
| 6,887,035 B2 | 5/2005 | Bruce | |
| 7,094,022 B2 | 8/2006 | Bruce | |
| 7,163,369 B2 | 1/2007 | Bruce | |
| 7,207,770 B2 | 4/2007 | Bruce | |
| 7,220,098 B2 | 5/2007 | Bruce et al. | |
| 7,445,427 B2 | 11/2008 | Gutknecht et al. | |
| 7,614,846 B2 | 11/2009 | Foucher et al. | |
| 9,228,438 B2 | 1/2016 | Dube et al. | |
| 9,476,262 B2 | 10/2016 | Benson et al. | |
| 9,835,053 B2 | 12/2017 | Do | |
| 9,932,988 B2 | 4/2018 | Maliniak et al. | |
| 9,976,438 B2 | 5/2018 | Klauke | |
| 10,125,789 B2 | 11/2018 | Maliniak et al. | |
| 10,184,511 B2 | 1/2019 | Mano | |
| 10,280,941 B2 | 5/2019 | Mouton et al. | |
| 10,393,146 B2 | 8/2019 | Bazot et al. | |
| 10,557,371 B2 | 2/2020 | Ruberte Sanchez | |
| 10,753,231 B2 | 8/2020 | Mena-Dominguez et al. | |
| 10,859,115 B2 | 12/2020 | Anders | |
| 2004/0045644 A1* | 3/2004 | Guther | ............ C22C 14/00 148/669 |
| 2005/0084190 A1 | 4/2005 | Brooks et al. | |
| 2006/0029494 A1 | 2/2006 | Bruce et al. | |
| 2007/0099027 A1 | 5/2007 | Krishnamurthy et al. | |
| 2018/0283457 A1 | 10/2018 | Plioska et al. | |

FOREIGN PATENT DOCUMENTS

| | | |
|---|---|---|
| EP | 3363996 B1 | 4/2020 |
| WO | 2017067759 A1 | 4/2017 |

OTHER PUBLICATIONS

Xu et al., "Tribological properties of TiAl matrix self lubricating composites incorporated with tungsten disulfide and zinc oxide", (2015), RSC Adv., 2015, 5, p. 45044-45052, DOI: 10.1039/c5ra04420k (Year: 2015).*

Xu et al., "Effect of Sliding Speed and Applied Load on Dry Sliding Tribological Performance of TiAl Matrix Self-lubricating Composites", Tribol Lett (2014) 55:393-404, DOI: 10.1007/s11249-014-0367-3 (Year: 2014).*

Extended European Search Report issued in corresponding EP Application No. 19158818.5, dated Apr. 4, 2019, pp. 1-7.

Office Action issued in corresponding CN Application No. 201910144718.0, dated Aug. 31, 2021, pp. 1-15.

Z. Xu, "Tribological properties of TiAl matrix self-lubricating composites incorporated with tungsten disulfide and zinc oxide," the Royal Society of Chemistry, 2015, pp. 45044-45052.

Huang, Lan "Microstructural Control and Alloy Design of the Ti-Al-Nb-W-B Alloys," PhD diss., University of Tennessee, 2008. https://trace.tennessee.edu/utk_graddiss/454.

Lapin, Juraj "TiAl-Based Alloys: Present Status and Future Perspectives," Institute of Materials and Machine Mechanics, Slovak Academy of Sciences, Metal 2009, Hradec nad Moravici, May 21, 2009.

Bittar, Brigitte and Bowen, Paul, "Fracture Toughness of Gamma-Based Titanium Aluminides," School of Metallurgy & Materials / IRC in High Performance Materials, University of Birmingham, ECF 11—Mechanisms and Mechanics of Damage and Failure, pp. 547-552.

Maziasz, P.J, Liu, C.T. and Wright, J.L, "Stability of Ultrafine Lamellar Structures During Aging in Two-Phase $\gamma$-TiAl Alloys," Oak Ridge National Laboratory, International Symposium on Structural Intermetallics (ISSI-2) Sep. 21-26, 1997, pp. 1-15.

Maziasz, P.J, Liu, C.T. and Wright, J.L, "Key Microstructures Controlling the Mechanical Properties of Two-Phase TiAl Alloys With Lamellar Structures," Metals and Ceramics Division, Oak Ridge National Laboratory, Feb. 12, 1997, pp. 1-9.

Mahdipoor, M.S., Kirols, H.S., Kevorkov, D., Jedrzejowski, P. and Medraj, M., "Influence of impact speed on water droplet erosion of TiAl compared with Ti6Al4V," Scientific Reports, www.nature.com/scientificreports, Sep. 22, 2015, pp. 1-17.

Z.B. Jiao et al. "Strategies for improving ductility of ordered intermetallics," Progress in Natural Science: Materials International 26, 2016, pp. 1-12.

* cited by examiner

SELF LUBRICATING TITANIUM ALUMINIDE COMPOSITE MATERIAL

CROSS REFERENCE TO RELATED APPLICATIONS

This application claims priority to commonly owned U.S. Provisional Application Ser. No. 62/635,211, entitled "A Self Lubricating Titanium Aluminide Composite Material", filed Feb. 26, 2018, the entirety of which is incorporated herein by reference.

FIELD OF THE INVENTION

The present invention relates generally to a titanium aluminide composite material doped with a high temperature solid lubricant that exhibits improved room temperature ductility, self-lubricating properties and low coefficient of friction without sacrificing advantageous characteristics such as low density, low wear, and creep and oxidation resistance.

BACKGROUND OF THE INVENTION

Titanium aluminide alloys are logical choices for the production of components in the aerospace and automobile industries due to their high strength, light weight and density, and their creep, and oxidation characteristics. Its light weight and density contributes to efforts in reduction of structural weight in aerospace and automotive applications. However, titanium aluminide alloys suffer from low ductility and are prone to low temperature brittleness and fracturing. These drawbacks stem at least in part from segregation of impurities, e.g., carbide and oxide precipitants, to grain boundaries in the alloy, which can cause intergranular fracture leading to component failure.

Based on the foregoing, there is a need for a titanium aluminide formulation that improves upon the ductility and reduces fracture tendency of titanium aluminide alloys, along with improved wear and reduced friction while maintaining the advantageous weight, density, creep, and oxidation properties.

Embodiments of the invention address the above needs, as well as others.

SUMMARY

There is disclosed herein a titanium aluminide composite material with increased room temperature (i.e., normal ambient temperature of approximately 20° F. to 25° C.) ductility. The composite material includes, but is not limited to, a Ti—Al matrix having a near-fully lamellar or fully lamellar microstructure composed of titanium, aluminum, niobium, manganese, boron, and carbon. The Ti—Al composite matrix is doped with at least one high temperature solid lubricant to create the titanium aluminide composite material. Components in whole or in part composed of the composite material are produced via powder metallurgy or other conventional metallurgical process.

There is disclosed herein a composite material that includes an alloy matrix including titanium, aluminum, niobium, manganese, boron, and carbon; and a solid lubricant. The alloy matrix has a two-phase, at least near-fully lamellar microstructure, with the solid lubricant being dispersed therein.

In one embodiment, the composite material includes, by atomic percentage, 40.0% to 50.0% Al, 1.0% to 8.0% Nb, 0.5% to 2.0% Mn, 0.1% to 2.0% B, and 0.01% to 0.2% C.

In one embodiment, the solid lubricant is present in the alloy matrix at an atomic percent of 1% to 30% of the composite material.

In one embodiment, the solid lubricant includes $MoS_2$, ZnO, CuO, hexagonal boron nitride (hBN), $WS_2$, $AgTaO_3$, $CuTaO_3$, $CuTa_2O_6$, or combinations thereof.

In one embodiment, the solid lubricant is substantially homogenously distributed as discrete, inert particles.

In one embodiment, the lamella have a maximum thickness of 1 µm.

In one embodiment, the titanium, aluminum, niobium, manganese, boron, and carbon are near-uniformly distributed throughout the alloy matrix.

In one embodiment, the composite material has a room temperature (i.e., ambient temperature) percent elongation of a minimum of 0.5%.

In one embodiment, the composite material has a coefficient of friction less than 0.065 from room temperature up to 800° C.

In one embodiment, the composite material has a wear rate less than $4.5 \times 10^{-4}$ $mm^3 \cdot N^{-1} \cdot m^{-1}$, from room temperature up to 800° C.

There is disclosed herein a method of making the above described composite material including via a melting process, a powder metallurgy process, or combinations thereof.

There is disclosed herein a bearing having an outer member; and an inner member in sliding engagement with the outer member. The inner member and/or the outer member include a composite material that includes an alloy matrix including titanium, aluminum, niobium, manganese, boron, and carbon; and a solid lubricant. The alloy matrix has a two-phase, at least near-fully lamellar microstructure, with the solid lubricant being dispersed therein.

In one embodiment, the composite material includes, by atomic percentage, 40.0% to 50.0% Al, 1.0% to 8.0% Nb, 0.5% to 2.0% Mn, 0.1% to 2.0% B, and 0.01% to 0.2% C.

In one embodiment, the composite material includes, by atomic percent, 1% to 30% solid lubricant.

In one embodiment, the solid lubricant includes $MoS_2$, ZnO, CuO, hexagonal boron nitride (hBN), $WS_2$, $AgTaO_3$, $CuTaO_3$, $CuTa_2O_6$, or combinations thereof.

In one embodiment, the solid lubricant is substantially homogenously distributed as discrete, inert particles.

In one embodiment, the lamella have a maximum thickness of 1 µm.

In one embodiment, the titanium, aluminum, niobium, manganese, boron, and carbons near-uniformly distributed throughout the alloy matrix.

In one embodiment, the composite material has a room temperature percent elongation of a minimum of 0.5%.

In one embodiment, the composite material has a coefficient of friction less than 0.065 from room temperature (i.e., ambient temperature) up to 800° C.

In one embodiment, the composite material has a wear rate less than $4.5 \times 10^{-4}$ $mm^3 \cdot N^{-1} \cdot m^{-1}$, from room (i.e., ambient temperature) temperature up to 800° C.

DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DETAILED DESCRIPTION

Figure 1:
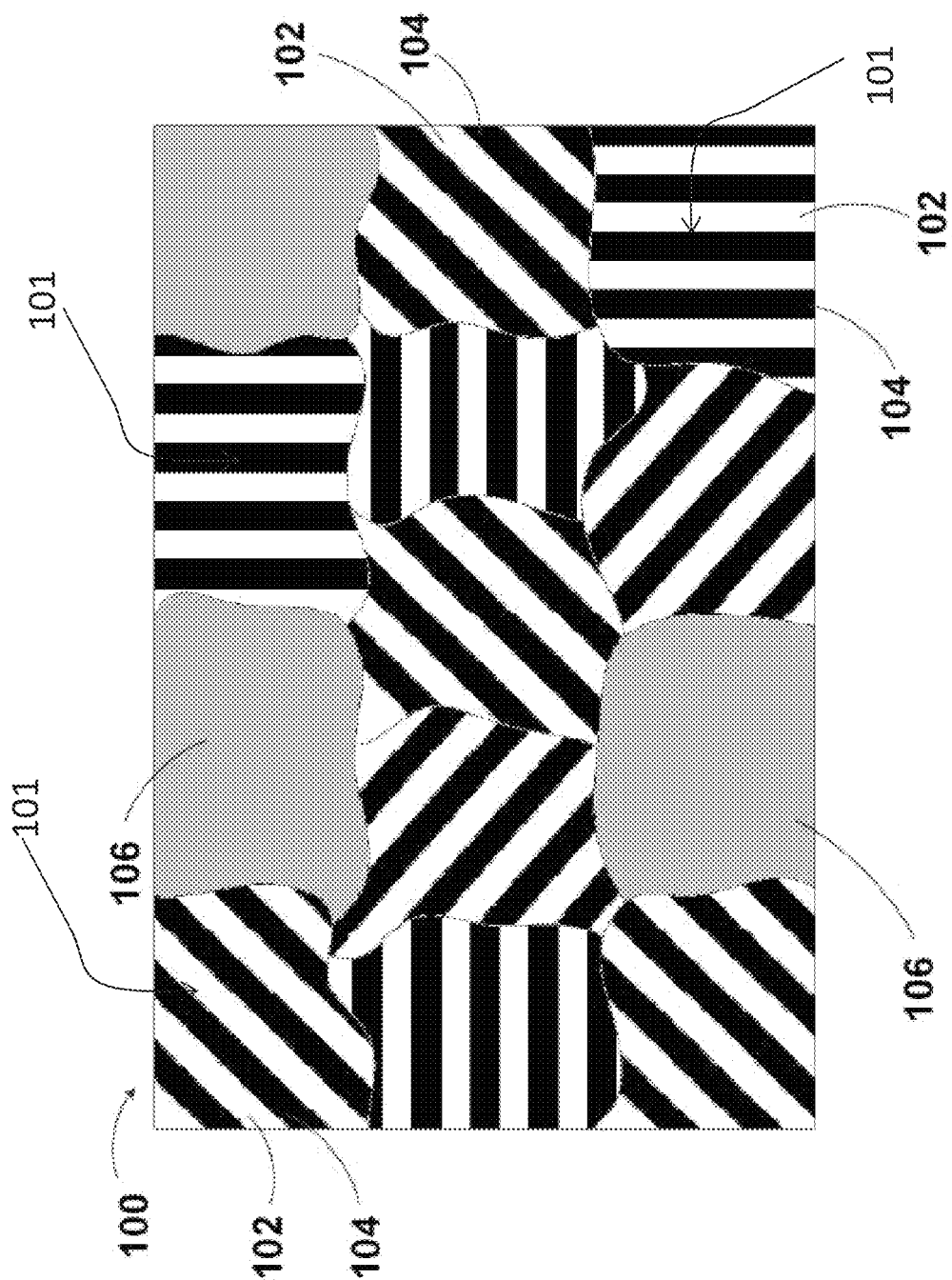
FIG. 1 is a schematic drawing of the microstructure of a composite material in accordance with embodiments of the invention.
Figure 2A:
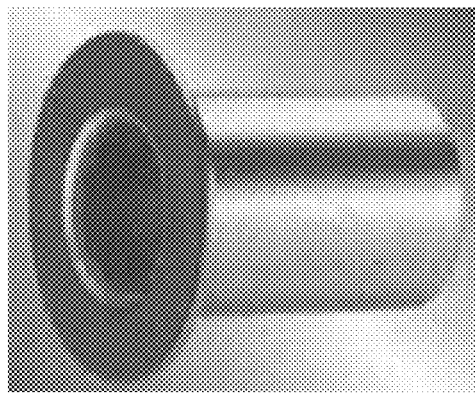
FIG. 2A is perspective view of bushing composed of the composite material of FIG. 1 in accordance with embodiments of the invention.
Figure 2B:
FIG. 2B is perspective view of a spherical bearing composed of the composite material of FIG. 1 in accordance with embodiments of the invention.
Figure 2C:
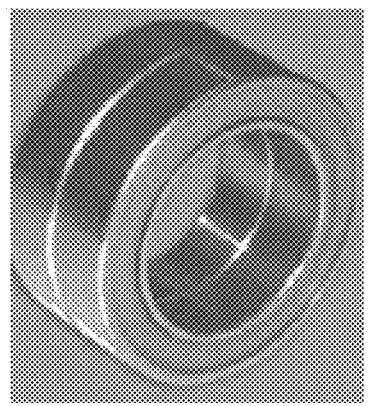
FIG. 2C is perspective view of a ball bearing composed of the composite material of FIG. 1 in accordance with embodiments of the invention.
Figure 2D:
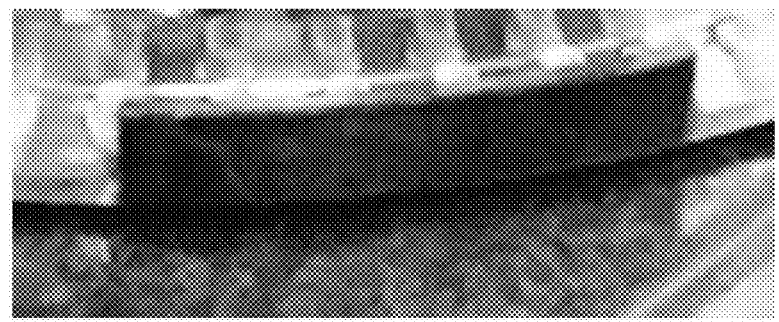
FIG. 2D is perspective view of a rub pad composed of the composite material of FIG. 1E in accordance with embodiments of the invention.
Figure 2E:
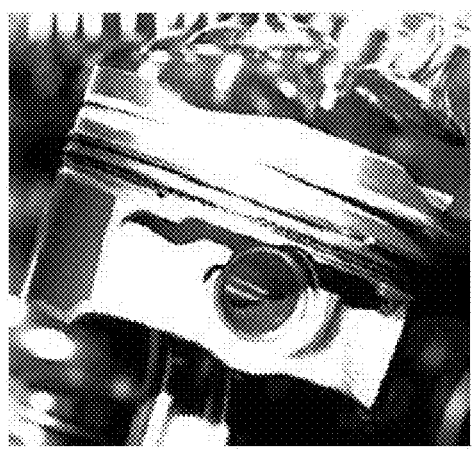
FIG. 2E is perspective view of engine components composed of the composite material of FIG. 1 in accordance with embodiments of the invention.

As shown in FIG. 1, the present disclosure is directed to a composite material 100 including an alloy matrix 101 of titanium, aluminum, niobium, manganese, boron, and/or carbon and a solid lubricant 106 dispersed therein. The alloy matrix 101 has a two-phase, at least near-fully lamellar microstructure, with the solid lubricant 106 being dispersed therein. The composite material 100 is an alloy that can be processed into low density, low-friction components that are also resistant to fracture, wear, creep, and oxidation, and further does not suffer from low temperature brittleness resulting from segregation of impurities to the grain boundaries.

The composite material 100 is a material made from two or more constituent materials having different physical or chemical properties that, when combined, produce a material with characteristics different from the individual components. The composite material 100 provides improved ductility at room temperature (approximately 23° C. (approximately 73° F.)), thereby allowing the components made in part or in whole by the composite material 100 to bend, rather than crack or shatter. The composite material 100 has a room temperature elongation of a minimum of 0.5% that allows it to bend rather than crack or shatter. In one embodiment, the composite material 100 has a room temperature percent elongation of 0.5-6.0%. In another embodiment, the composite material 100 has a room temperature percent elongation of 1.0-5.5%. In yet another embodiment, the composite material 100 has a room temperature elongation of 1.0-5.0%.

The composite material 100 of the present disclosure exhibits a dynamic coefficient of friction of less than approximately 0.065, from room temperature up to approximately 800° C. (1472° F.), which is consistent with coefficients of friction for lubricants such as Polytetrafluoroethylene (PTFE) (approximately 0.04-approximately 0.12), and is an improvement over typical coefficients of friction in metal to metal applications (approximately 0.3-approximately 0.6). Thus, the composite material 100 enables a significantly improved coefficient of friction for a sintered powder metal formed component (i.e., composite material 100). The low dynamic coefficient of friction of the composite material 100 provides for reduced wear and improved control over system torque in a variety of applications, as discussed in greater detail below, particularly in comparison to typical metal to metal designs.

Further, the composite material 100 of the present disclosure exhibits a specific wear rate less than approximately $4.5 \times 10^{-4}$ mm$^3 \cdot$N$^{-1} \cdot$m$^{-1}$, from room temperature up to approximately 800° C.

The composite material 100 is a titanium aluminide alloy matrix doped with one or more solid lubricants 106. In one embodiment, the composite material 100 includes, by overall atomic percentage, from approximately 40.0% to approximately 50.0% aluminum (Al), from approximately 1.0% to approximately 8.0% niobium (Nb), from approximately 0.5% to approximately 2.0% manganese (Mn), from approximately 0.1% to approximately 2.0% boron (B), and from approximately 0.01% to approximately 0.2% carbon (C).

The composite material 100 has the Ti—Al matrix 101 with a near-fully lamellar or fully lamellar microstructure is doped with solid high-temperature lubricants 106 imparting self-lubricating properties and improved room temperature ductility. As used herein, the term "doped" is used to refer to any suitable process of incorporating the solid high-temperature lubricant 106 into the composite material 100. The term "self-lubricating", as used herein, means that the solid lubricant 106 provides lubricating properties such as low coefficient of friction without the need for supplemental lubricants such as grease or oil. The composite material 100 includes, by atomic percentage, approximately 1% to approximately 30% solid lubricant 106. The solid lubricant 106 is composed of $MoS_2$, ZnO, CuO, hexagonal boron nitride (hBN), $WS_2$, $AgTaO_3$, $CuTaO_3$, $CuTa_2O_6$, and the like, or combinations thereof. The solid lubricant 106 has a substantially homogenous distribution in the composite material 100 and is dispersed in the composite matrix 101 as discrete, inert particles. The remaining component of the composite material 100 is composed substantially of titanium (Ti).

The microstructures of the titanium aluminide alloy matrix 101 are near-fully lamellar or fully lamellar. The titanium aluminide alloy matrix 101 is composed substantially of two phases, $\alpha_2$ layers 102 (lighter areas) and γ phase layers 104 (darker areas). The $\alpha_2$ layers 102 are composed substantially of $Ti_3Al$. The γ layers 104 are composed substantially of TiAl. The thickness of the $\alpha_2$ layers 102 and the γ layers 104 is limited to help preserve ductility in the composite material 100. In one embodiment, the $\alpha_2$ layers 102 and the γ layers 104 have a maximum thickness of approximately 0.1 μm to approximately 1 μm. The Mn component of the composite material 100 is uniformly or near-uniformly distributed throughout the microstructure. Fine particles, e.g., borides, are found at the boundaries between adjacent portions within the composite material 100.

The composite material 100 is produced via metallurgical processes, e.g., melting processes, powder metallurgy, etc., or combinations thereof. Accordingly, the composite material 100 can advantageously be produced by generally conventional methods, and can be used to manufacture components of any desired shape for a broad range of applications, as explained above. The process for producing the composite material 100 is designed to limit the thickness of the α2 layers 102 and the γ layers 104, e.g., increasing the cooling rate following a sintering step in a powder metallurgy process.

The microstructure of the composite material 100 is designed to preferentially entrap impurities associated with the powder metallurgical processes, e.g., carbon, oxygen, etc., within the $\alpha_2$ layers 102, rather than at grain boundaries of the alloy. Additionally, the grain boundaries of the composite material 100 are refined by precipitation of $TiB_2$ at those grain boundaries. Combined with the reduced thickness of the $\alpha_2$ layers 102 and the $\gamma$ layers 104, the composite material 100 exhibits the improved ductility at room temperature (i.e., ambient temperature of about 20 to 25 degrees Celsius), overcoming the low temperature brittleness and fracture tendency of prior titanium aluminide alloys.

Figure 3:
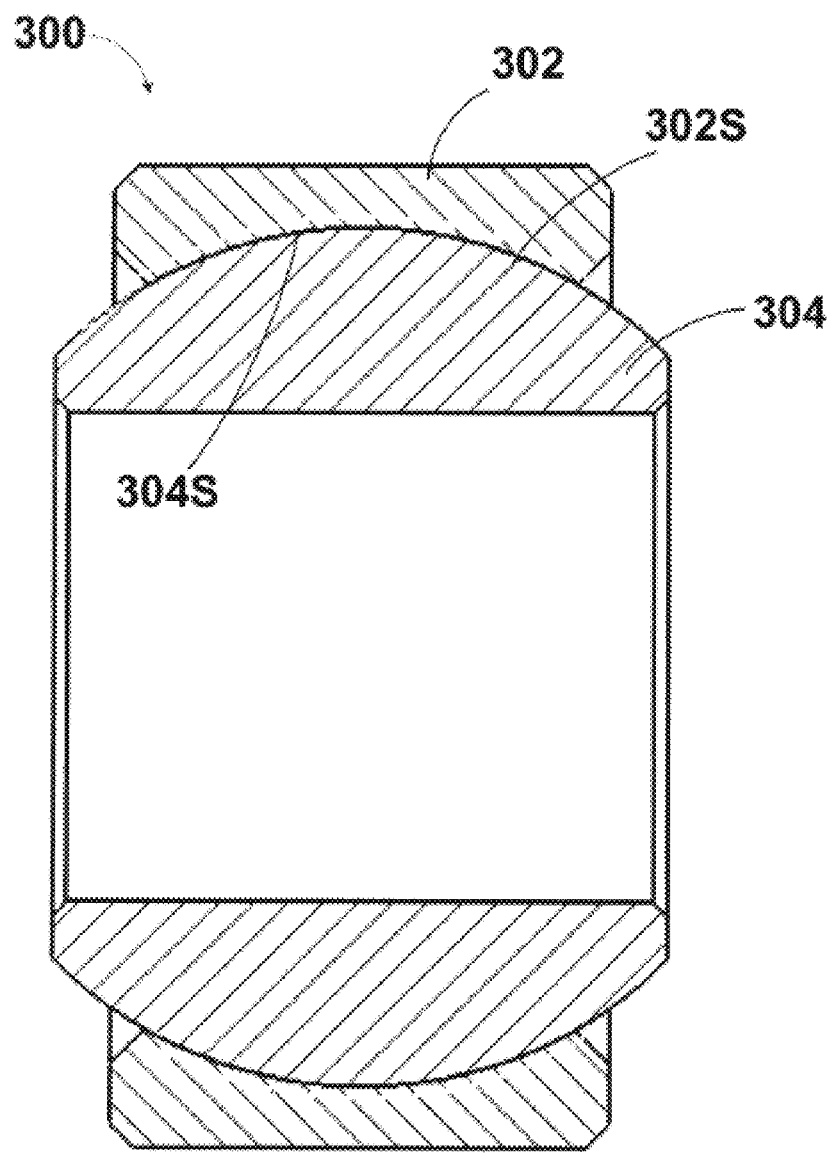
FIG. 3 is a cross sectional view of a spherical bearing composed of the composite material of FIG. 1 in accordance with embodiments of the invention.

As shown in FIGS. 2A-2E, the composite material 100 is suitable for use in the construction of components for a variety of applications including, but not limited to, bushings (FIG. 2A), e.g., in doors, aircraft landing gear, turbine engines, etc.; spherical bearings (FIG. 2B), e.g., in aircraft landing gear, turbine engines, oil and gas valves, etc.; ball bearings (FIG. 2C), e.g., in tail rotors, engine gear boxes, transmissions, etc.; rub pads (FIG. 2D), e.g., in turbine engines, wear plates, pipe sleeves, etc.; engine components (FIG. 2E), e.g., in pistons, etc.; and the like. In this regard, such components can be fashioned in whole or in part of the composite material 100. An exemplary spherical plain bearing 300 is shown in FIG. 3. The spherical plain bearing 300 includes an outer member 302 and an inner member 304, wherein the inner member 304 is disposed at least partially within the outer member 302. The outer member 302 includes an inner surface 302S and the inner member 304 includes an outer surface 304S. The outer member 302 and the inner member 304 are in sliding engagement with each other via the inner surface 302S and the outer surface 304S. The outer member 302 and the inner member 304 are each composed, in whole or in part, of the composite material 100. While the spherical plain bearing 300 is shown, the composite material 100 may be fashioned into any suitable configuration as described above without departing from the invention of the present disclosure.

Although the present invention has been disclosed and described with reference to certain embodiments thereof, it should be noted that other variations and modifications may be made, and it is intended that the following claims cover the variations and modifications within the true scope of the invention.

What is claimed is:

1. A composite material comprising:
   a titanium aluminide alloy matrix including titanium, aluminum, niobium, manganese, boron, and carbon; and
   a solid lubricant,
   wherein the alloy matrix has a two-phase, fully lamellar microstructure, with the solid lubricant being dispersed therein;
   wherein the composite material comprises, by atomic percentage, 40.0% to 50.0% Al, 1.0% to 8.0% Nb, 0.5% to 2.0% Mn, 0.1% to 2.0% B, and 0.01% to 0.2% C;
   wherein the solid lubricant is present in the alloy matrix at an atomic percentage of 1% to 30% of the composite material.

2. The composite material according to claim 1, wherein the solid lubricant consists of hexagonal boron nitride (hBN).

3. The composite material according to claim 1, wherein the solid lubricant is substantially homogenously distributed as discrete, inert particles.

4. The composite material according to claim 1, wherein the lamella have a maximum thickness of 1 μm.

5. The composite material according to claim 1, wherein the titanium, aluminum, niobium, manganese, boron, and carbon are uniformly distributed throughout the alloy matrix.

6. The composite material according to claim 1, wherein the composite material has a room temperature percent elongation of a minimum of 0.5%.

7. The composite material according to claim 1, wherein the composite material has a coefficient of friction less than 0.065 from room temperature up to 800° C.

8. The composite material according to claim 1, wherein the composite material has a wear rate less than $4.5 \times 10^{-4}$ $mm^3 \cdot N^{-1} \cdot m^{-1}$, from room temperature up to 800° C.

9. A bearing comprising:
   an outer member; and
   an inner member in sliding engagement with the outer member;
   wherein at least one of the inner member and the outer member consists of the fully lamellar composite material according to claim 1.

10. The composite material of claim 1, wherein the solid lubricant consists of $MoS_2$.

11. The composite material of claim 1, wherein the solid lubricant consists of ZnO.

12. The composite material of claim 1, wherein the solid lubricant consists of CuO.

13. The composite material of claim 1, wherein the solid lubricant consists of $WS_2$.

14. The composite material of claim 1, wherein the solid lubricant consists of $AgTaO_3$.

15. The composite material of claim 1, wherein the solid lubricant consists of $CuTaO_3$.

16. The composite material of claim 1, wherein the solid lubricant consists of $CuTa_2O_6$.

17. A composite material comprising:
   a titanium aluminide alloy matrix including titanium, aluminum, niobium, manganese, boron, and carbon; and
   a solid lubricant,
   wherein the alloy matrix has a two-phase, near-fully lamellar microstructure, with the solid lubricant being dispersed therein;
   wherein the composite material comprises, by atomic percentage, 40.0% to 50.0% Al, 1.0% to 8.0% Nb, 0.5% to 2.0% Mn, 0.1% to 2.0% B, and 0.01% to 0.2% C;
   wherein the solid lubricant is present in the alloy matrix at an atomic percent of 1% to 30% of the composite material.

18. The composite material according to claim 17, wherein the solid lubricant consists of hexagonal boron nitride (hBN).

19. The composite material according to claim 17, wherein the solid lubricant is substantially homogenously distributed as discrete, inert particles.

20. The composite material according to claim 17, wherein the lamella have a maximum thickness of 1 μm.

21. The composite material according to claim 17, wherein the titanium, aluminum, niobium, manganese, boron, and carbon are uniformly distributed throughout the alloy matrix.

22. The composite material according to claim 17, wherein the composite material has a room temperature percent elongation of a minimum of 0.5%.

23. The composite material according to claim 17, wherein the composite material has a coefficient of friction less than 0.065 from room temperature up to 800° C.

24. The composite material according to claim 17, wherein the composite material has a wear rate less than $4.5 \times 10^{-4}$ mm$^3 \cdot$N$^{-1} \cdot$m$^{-1}$, from room temperature up to 800° C.

25. The composite material of claim 17, wherein the solid lubricant consists of MoS$_2$.

26. The composite material of claim 17, wherein the solid lubricant consists of ZnO.

27. The composite material of claim 17, wherein the solid lubricant consists of CuO.

28. The composite material of claim 17, wherein the solid lubricant consists of WS$_2$.

29. The composite material of claim 17, wherein the solid lubricant consists of AgTaO$_3$.

30. The composite material of claim 17, wherein the solid lubricant consists of CuTaO$_3$.

31. The composite material of claim 17, wherein the solid lubricant consists of CuTa$_2$O$_6$.

32. A bearing comprising:
an outer member; and
an inner member in sliding engagement with the outer member;
wherein at least one of the inner member and the outer member consists of the near-fully lamellar composite material according to claim 17.

33. The composite material of claim 1, wherein impurities are trapped within $\alpha_2$ layers of the microstructure.

34. The composite material of claim 33, wherein the impurities are associated with a powder metallurgical process used to make the composite material.

35. The composite material of claim 33, wherein the impurities comprise either one or both of carbon and oxygen.

36. The composite material of claim 1, wherein grain boundaries of the composite material are refined by precipitation of TiB$_2$ at the grain boundaries.

37. The composite material of claim 1, wherein
the alloy matrix is composed of $\alpha_2$ layers and $\gamma$ layers,
the $\alpha_2$ layers are composed substantially of Ti$_3$Al,
the $\gamma$ layers are composed substantially of TiAl, and
the $\alpha_2$ layers and the $\gamma$ layers have a maximum thickness of 0.1 μm to 1 μm.

* * * * *